United States Patent
Weissman et al.

(10) Patent No.: US 9,172,890 B2
(45) Date of Patent: Oct. 27, 2015

(54) METHOD, APPARATUS, AND MANUFACTURE FOR ENHANCED RESOLUTION FOR IMAGES FROM HIGH DYNAMIC RANGE (HDR) INTERLACED SENSORS

(71) Applicant: Qualcomm Technologies, Inc., San Diego, CA (US)

(72) Inventors: Assaf Weissman, Moreshet (IL); Pia Zobel, Hinanit (IL)

(73) Assignee: QUALCOMM TECHNOLOGIES, INC., San Diego, CA (US)

( * ) Notice: Subject to any disclaimer, the term of this patent is extended or adjusted under 35 U.S.C. 154(b) by 66 days.

(21) Appl. No.: 13/932,905

(22) Filed: Jul. 1, 2013

(65) Prior Publication Data

US 2015/0002689 A1  Jan. 1, 2015

(51) Int. Cl.
*H04N 5/235* (2006.01)
(52) U.S. Cl.
CPC .................................. *H04N 5/2355* (2013.01)
(58) Field of Classification Search
CPC ................ H04N 5/35581; H04N 5/35572
See application file for complete search history.

(56) References Cited

U.S. PATENT DOCUMENTS

| | | | |
|---|---|---|---|
| 7,239,805 B2 | 7/2007 | Uyttendaele et al. | |
| 2005/0013601 A1* | 1/2005 | Ide et al. | 396/121 |
| 2010/0157147 A1* | 6/2010 | Bellers | 348/448 |
| 2011/0176028 A1* | 7/2011 | Toyoda | 348/223.1 |
| 2011/0211732 A1* | 9/2011 | Rapaport | 382/107 |
| 2012/0002902 A1* | 1/2012 | Zhou et al. | 382/309 |
| 2012/0188400 A1* | 7/2012 | Smith | 348/223.1 |
| 2013/0016253 A1* | 1/2013 | Kobayashi | 348/239 |
| 2013/0051700 A1* | 2/2013 | Jo | 382/284 |

\* cited by examiner

*Primary Examiner* — Jason Flohre
(74) *Attorney, Agent, or Firm* — Knobbe, Martens, Olson & Bear LLP

(57) ABSTRACT

A method, apparatus, and manufacture for generating an HDR image is provided. An original image is received from an HDR interlaced sensor that includes at least two fields captured with different exposures. The fields are separated from each other to provide separate images, and each of the separate images is upscaled. Next, blending is performed on each of the upscaled separate images to generate a high-dynamic range image, and ghost identification is performed on the high-dynamic range image. Subsequently, detail identification is performed on the high-dynamic range image. The detail identification includes identifying areas in the non-ghost areas of the high-dynamic range image that have details, and modifying the high-dynamic image by replacing each of the areas identified to have details with the corresponding area from the original image.

20 Claims, 3 Drawing Sheets

METHOD, APPARATUS, AND MANUFACTURE FOR ENHANCED RESOLUTION FOR IMAGES FROM HIGH DYNAMIC RANGE (HDR) INTERLACED SENSORS

TECHNICAL FIELD

The invention is related to high-dynamic range (HDR) images, and in particular, but not exclusively, to a method, apparatus, and manufacture for gaining high dynamic range resolution from an HDR interlaced sensor while minimizing loss of spatial density.

BACKGROUND

Images captured by digital cameras are most commonly Low Dynamic Range (LDR) images, which have a loss of detail in bright or dark areas of a picture, depending on the camera's exposure setting. A High Dynamic Range (HDR) image can accurately represent dark areas (e.g., shadows) and well-lighted areas (e.g., sunlight). An HDR image can be captured, for example, by acquiring at least two LDR images of a scene that are captured at different exposure levels. These LDR images are called a bracketed exposed image series. A low exposure level will properly capture the scene areas fully illuminated by bright sunlight and a high exposure level will properly capture the scene areas that are dimly lighted (e.g., areas that are shadowed by other objects like buildings). By mixing these LDR images, an HDR image can be generated that depicts the full dynamic range of the scene.

BRIEF DESCRIPTION OF THE DRAWINGS

Non-limiting and non-exhaustive embodiments of the present invention are described with reference to the following drawings, in which.

DETAILED DESCRIPTION

Figure 1:
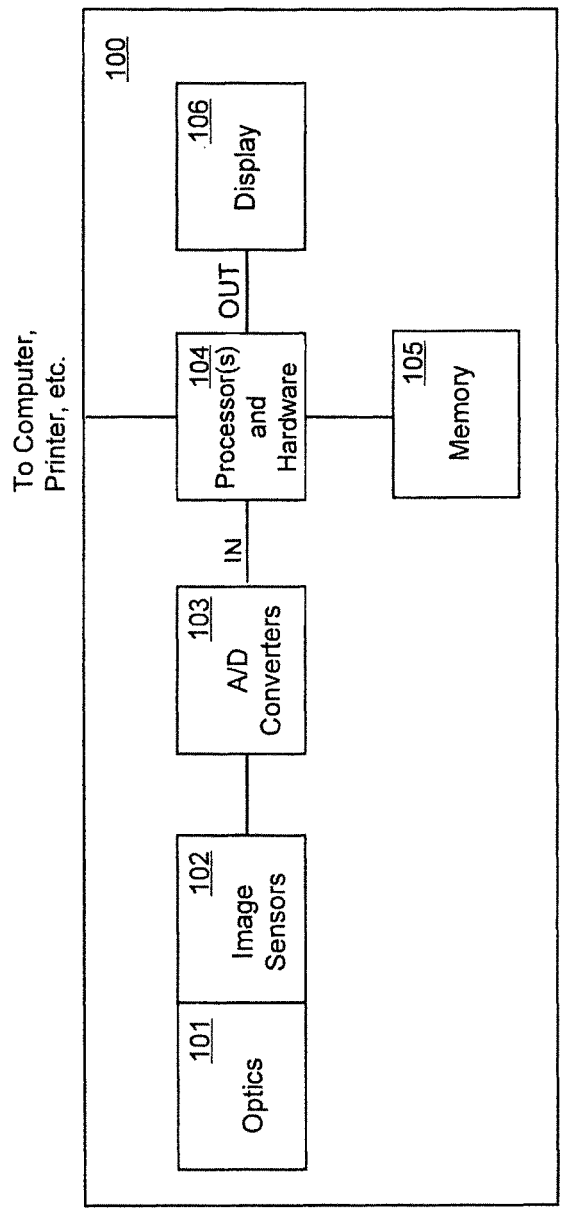
FIG. 1 illustrates a block diagram of an embodiment of a device.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. Similarly, the phrase "in some embodiments," as used herein, when used multiple times, does not necessarily refer to the same embodiments, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "signal" means at least one current, voltage, charge, temperature, data, or other signal.

Briefly stated, the invention is related to a method, apparatus, and manufacture for generating an HDR image. An original image is received from an HDR interlaced sensor that includes at least two fields captured with different exposures. The fields are separated from each other to provide separate images, and each of the separate images is upscaled. Next, blending is performed on each of the upscaled separate images to generate a high-dynamic range image, and ghost identification is performed on the high-dynamic range image. Subsequently, detail identification is performed on the high-dynamic range image. The detail identification includes identifying areas in the non-ghost areas of the high-dynamic range image that have details, and modifying the high-dynamic image by replacing each of the areas identified to have details with the corresponding area from the original image.

FIG. 1 shows a block diagram of an embodiment of device 100, which may be a digital camera or the like. Device 100 includes a set of optics (e.g., one or more lenses and/or light guides) 101, a set of image sensors 102 optically coupled to the optics 101, a set of analog-to-digital (A/D) converters 103 having inputs electrically coupled to outputs of the image sensors 102, and one or more processors and hardware 104 coupled to receive the outputs of the A/D converters 103. The image sensors 102 may produce separate R, G and B color signals. Image sensors 102 may be configured to operate as a high dynamic range (HDR) interlaced sensor. Camera 100 further includes a display device 106 coupled to outputs of the processor(s) and hardware 104, and a memory 105 having bi-directional communication with the processor(s) 104. Display device 106 is optional, and is not included in all embodiments of device 100.

In operation, the image sensors 102 receive input light through the optics 101 and, in response, produce analog output color signals R, G, and B to the A/D converters. The A/D converters convert those input color signals to digital form, which are provided to the processor(s) 104.

The processor(s) and hardware 104 may include a CPU as well as specialized hardware, as discussed in greater detail below. Processor(s) 104 may perform any of various well-known types of processing on those input color signals. The processor(s) 104 may be or include, for example, any one or more of: a programmed microprocessor or digital signal processor (DSP), a microcontroller, an application specific integrated circuit (ASIC), a programmable logic device (PLD), etc. Processor(s) and hardware 104 may perform various processes, such as the process illustrated in FIG. 2.

Memory 105 may be or include, for example, anyone or more of: flash memory, read-only memory, random access memory (RAM), etc. Memory 105 may include a tangible, processor-readable storage medium that arranged to encode processor-readable code, which, when executed processor(s) 104, enables actions. Actions enabled by processor(s) 104, which may include action(s) controlled by processor(s) 104 but actually performed by other parts of device 100, may perform various processes such as the process illustrated in FIG. 2.

Device 100 is not limited to consumer digital cameras, but may include other types of imaging devices that capture images in a variety of different manners.

Processed or raw color data can be output to the display device 106 for display and/or to one or more external devices, such as a computer or printer.

In some embodiments, image sensor 102 is arranged to capture an original image that includes at least two fields captured with different exposures. Image sensors 102 capture the original image such that the original image includes at least two fields, where each field of the original image includes a subset of the lines in the original image such that the lines of each of the fields are interlaced with each other. Each of the fields of the originals is captured at a different exposure level than each other field of the at least two fields, where there is at least a partial overlap in capture time of each of the at least two fields with each other field of the at least two fields. In some embodiments, the fields include exactly two fields, a first field that includes each of the odd lines in the original image, and a second field that includes each of the even lines in the original image.

For example, in some embodiments, the original image is captured as two interleaved fields of sets of two Bayer image lines. Each field is exposed to a different amount of light. One field is captured with short exposure, and the other field is captured with a long exposure.

Figure 2:
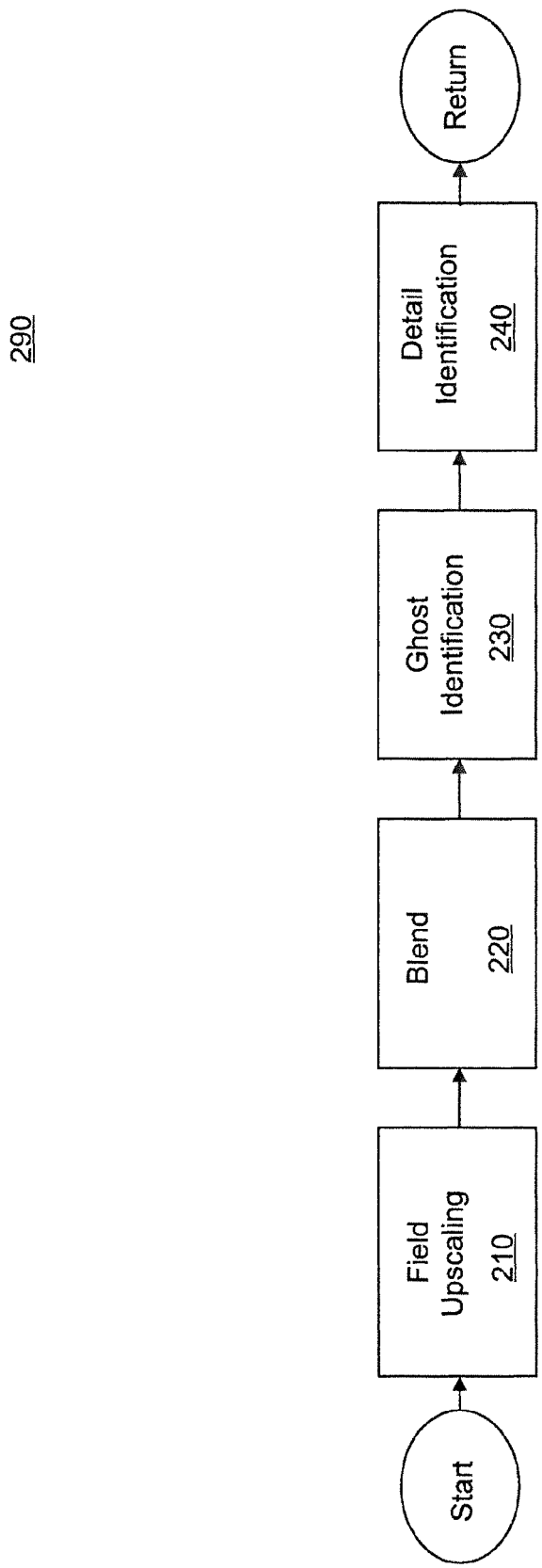
FIG. 2 shows a flowchart of an embodiment of a process that may be employed by an embodiment of the device of FIG. 1.

FIG. 2 shows a flowchart of an embodiment of process 290, which may be employed by an embodiment of processor 104 of FIG. 1. After a start block, the process proceeds to block 210, where an original image is received, the fields in the original image are separated to provide separate images, and the separate images are upscaled. The original image is received from an HDR interlaced sensor as discussed above with regard to FIG. 1 in some embodiments.

Next, the process moves to block 220, where blending is performed on each of the upscaled separate images to generate a high-dynamic range image. The process then advances to block 230, where ghost identification is performed on the high-dynamic range image. Subsequently, the process proceeds to block 240, where detail identification is performed on the high-dynamic range image. The detail identification includes identifying areas in the non-ghost areas of the high-dynamic range image that have details, and modifying the high-dynamic image by replacing each of the areas identified to have details with the corresponding area from the original image. The process then moves to a return block, where other processing is resumed.

A particular embodiment of process 290 is discussed in greater detail below.

HDR images are typically generated using exposure-bracketed images taken one after the other that are subsequently merged into an HDR image. However, embodiments of the invention instead employ an image from an HDR interlaced sensor.

In some embodiments, such HDR sensors are built as two interleaved fields of sets of two Bayer image lines. Each field is exposed to a different amount of light. One field is captured with short exposure and is utilized for very light areas which would be saturated with regular exposure. The other field is captured with a long exposure and is utilized for dark areas to bring out details in these areas.

The two fields are captured at the same time except for the fact that the longer exposure takes longer, so that lines with the shorter exposure are captured at a time period that completely overlaps the time period at which the lines with the longer exposure are captured, and the lines with the longer exposure are captured during a time period that occurs both during the time that the lines with a shorter exposure are captured, and at a time beyond the time (either before or after) that the lines with a shorter exposure are captured.

After capturing the original image, the original image is normalized. Since each field has a different exposure, the resulting luma values are different. For this reason, a normalization is applied to the original image to bring the values of the overexposed field down to the values of the underexposed field. It some embodiments, the normalization may be accomplished by multiplying each field to a constant value such that the luma values are normalized to compensate for the different exposures used.

When the information for both fields is used there is a higher dynamic range than just using one exposure. However, each field has less spatial density than the original image. Embodiments of the invention may be employed to gain the high dynamic range given by the sensor while gaining back as much as possible of the spatial density.

As discussed above, in some embodiments, the two fields are separated and each field is upscaled with the most density possible. In some embodiments, during the upscaling, the missing pixels are added by looking at pixels in their area and averaging over the "best" pixels to create the missing pixel and trying to minimize artifacts between fields.

Figure 3C:
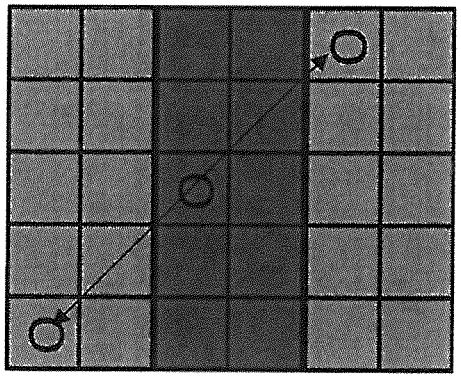
FIGS. 3A, 3B, and 3C illustrate different directions that may be employing for averaging pixel values during upscaling, in accordance with aspects of the invention.
Figure 3B:
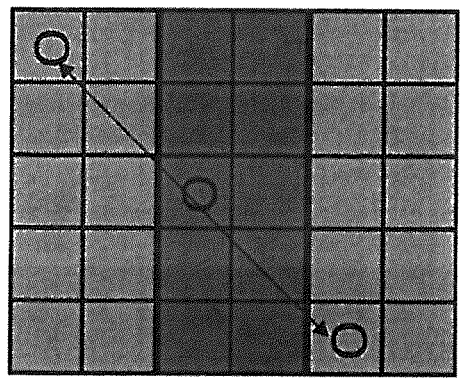
Figure 3A:
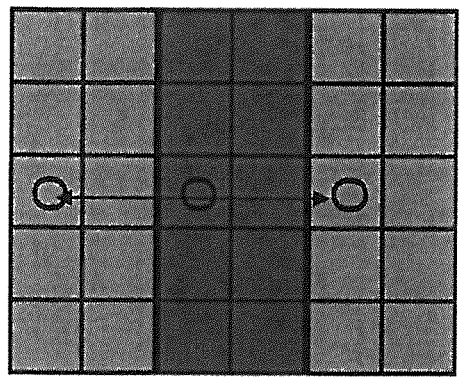

FIGS. 3A, 3B, and 3C illustrate different directions that may be employing for averaging pixel values during upscaling. In the example shown in FIGS. 3A-3C, three different directions are defined for averaging: Vertical, Diagonal1, and Diagonal2, respectively. The direction with the minimum derivative is selected for the averaging direction. The derivatives are calculated as $|P_1-P_2|$ where $P_1$ and $P_2$ are the pixels used in the average calculation. In other embodiments, one or more additional directions may be used during the field upscaling. The upscaling may performed in any suitable manner in various embodiments.

After upscaling, the two fields are blended. During blending, in some embodiments, very light areas are identified, the underexposed upscaled field is chosen for these areas. The overexposed upscaled field is chosen for the rest of the areas. Also, blending may be employed between the areas where the overexposed upscaled is used and the underexposed upscaled field is used, so that the middle areas between the selected images transition smoothly as opposed to using abrupt transitions between the areas where the different images were selected.

During various phases of the process, luma values of pixel groups are utilized, as well as differences in luma values between two different close areas of groups of pixels. The size of pixel areas to be used may be determined as follows in some embodiments.

The optimal size employed may vary based on, for example, the resolution. Greater resolutions may use more pixels, and with smaller resolutions, fewer pixels may be employed. In some embodiments, the size may be hard-coded for any particular image size. During design, the designer may test the results of various pixel sizes to determine the size of each area to employ (in terms of number of pixels) for any given image size.

During blending, the luma for each pixel in the blended image is calculated as an average over some pixels in the relevant area. The resulting pixel is calculated as a blend of the two fields. The input parameter to the blend function is the luma. For areas with high luma the short exposure field should be significant, and for areas with low luma the long exposure field should be significant. In some embodiments, the function is chosen to create spatial continuity in the resulting image, and overexposed areas are mainly based on the short exposure field.

After blending, ghost areas are identified, and the underexposed upscaled field is chosen for these ghost areas. A ghost area is identified when there is a large difference between the two fields. For example, it is possible to calculate the average difference of the luma values in the relevant area. If the difference is large, the pixel is defined as a ghost. The resulting ghost map can be filtered to remove noise and to create temporal and spatial continuity.

Embodiments of the invention may be employed for both HDR video and still HDR images. For still images, temporal continuity is not applicable, but spatial continuity is still employed.

As discussed above, the fields captured with a longer exposure time can have movement that does not occur during the time that the field with the shorter exposure time is captured, which may result in a ghost. During ghost identification, larger areas of pixels are used than other steps, to ensure that the entirety of a ghost artifact is removed rather than only removing a portion of a ghost artifact.

After ghost identification, areas with details in the non-ghost areas are indentified, and the original image is chosen for these areas. In some embodiments, the original image is used in detail and edge areas only. Details and edges can be identified as areas with large luma differences between adjacent pixels, whereas noise is areas with small luma differences between adjacent pixels. In addition, in some embodiments, the original image is used only in areas where the two fields are similar.

During detail identification, areas with details (including edges) are identified by identifying locations in the image where the difference between luma values of two different close areas of groups of pixels exceed a threshold. In various embodiments, the differences may be detected in different and multiple directions. Noise cleaning may also be performed to help ensure that noise does not result in false indications of detail. Such noise cleaning may include pixels averaging and other techniques. Noise cleaning may be performed in each of the steps, using techniques such as employing pixel averages, weighted averages, employing different ways of comparing the averages, excluding excessively noisy groups of pixels, and/or the like.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A method, comprising:
receiving an original image that includes lines and at least two fields, each field of the at least two fields including a subset of the lines in the original image such that the lines of each of the at least two fields are interlaced with each other, each of the at least two fields captured at a different exposure than each other such that there is at least a partial overlap in capture time for each of the at least two fields;
normalizing the original image to bring values of at least one of the at least two fields down to values of a different field;
separating each of the at least two fields from each other to provide separate images;
upscaling each of the separate images;
blending the upscaled separate images to generate a high-dynamic range image;
performing ghost identification on the high-dynamic range image; and
performing detail identification on the high-dynamic range image, including identifying areas in the non-ghost areas of the high-dynamic range image that have details, and modifying the high-dynamic image by replacing each of the areas identified to have details with the corresponding area from the original image, the size of the identified areas being based at least in part on the resolution of the original image;
wherein identifying the areas in the non-ghost areas comprising identifying at least one location in the high-dynamic range image where a difference between luma values of two different close areas exceed a threshold.

2. The method of claim 1, wherein the at least two fields include a first field that includes each of the odd lines in the original image, and a second field that includes each of the even lines in the original image.

3. The method of claim 1, further including employing a high dynamic range (HDR) sensor to capture the original image such that: the original image includes lines, the original image includes at least two fields, each field of the at least two fields includes a subset of the lines in the original image such that the lines of each of the at least two fields are interlaced with each other, each of the at least two fields is captured at a different exposure than each other field of the at least two fields, and such that there is at least a partial overlap in capture time of each of the at least two fields with each other field of the at least two fields.

4. The method of claim 1, wherein identifying areas in the non-ghost areas of the high-dynamic range image that have details includes identifying areas in the non-ghost areas of the high-dynamic range image that have edges.

5. The method of claim 1, wherein
upscaling each of the separate images includes, for each of a plurality of pixel values to be determined, determining difference in pixel values from a plurality of different directions on each side of the pixels, and for each of the different directions, determining the direction at which the difference between pixels values in that direction is the least from among of the plurality of directions, and employing the average of the pixels in the determined direction for the pixel value to be determined.

6. The method of claim 5, wherein the plurality of directions include a vertical direction, a first diagonal direction, and a second diagonal direction that is different from the first diagonal direction.

7. The method of claim 1, wherein identifying areas in the non-ghost areas of the high-dynamic range image that have details is accomplished at least in part by identifying the non-ghost areas of the high-dynamic range image in which the difference in average luma values between close groups of pixels exceeds a pre-determined threshold.

8. The method of claim 7, wherein the size of each of the groups of pixels is pre-determined.

9. The method of claim 7, wherein identifying the non-ghost areas of the high-dynamic range image in which the difference in average luma values between close groups of pixels exceeds the pre-determined threshold further includes noise cleaning.

10. The method of claim 7, wherein identifying the non-ghost areas of the high-dynamic range image in which the difference in average luma values between close groups of pixels exceeds the pre-determined threshold is accomplished in at least two different directions.

11. An apparatus, comprising:
a memory that is configured to store code; and
at least one processor that is configured to execute the code to enable actions, including:
receiving an original image that includes lines and at least two fields, each field of the at least two fields including a subset of the lines in the original image such that the lines of each of the at least two fields are interlaced with each other, each of the at least two fields captured at a different exposure than each other such that there is at least a partial overlap in capture time for each of the at least two fields;
normalizing the original image to bring values of at least one of the at least two fields down to values of a different field;
separating each of the at least two fields from each other to provide separate images;
upscaling each of the separate images;
blending the upscaled separate images to generate a high-dynamic range image;
performing ghost identification on the high-dynamic range image; and
performing detail identification on the high-dynamic range image, including identifying areas in the non-ghost areas of the high-dynamic range image that have details, and modifying the high-dynamic image by replacing each of the areas identified to have details with the corresponding area from the original image, the size of the identified areas being based at least in part on the resolution of the original image;
wherein identifying the areas in the non-ghost areas comprising identifying at least one location in the high-dynamic range image where a difference between luma values of two different close areas exceed a threshold.

12. The apparatus of claim 11, further comprising a high-dynamic range (HDR) sensor that is arranged to capture the original image such that: the original image includes lines, the original image includes at least two fields, each field of the at least two fields includes a subset of the lines in the original image such that the lines of each of the at least two fields are interlaced with each other, each of the at least two fields is captured at a different exposure than each other field of the at least two fields, and such that there is at least a partial overlap in capture time of each of the at least two fields with each other field of the at least two fields.

13. The apparatus of claim 11, wherein the at least one processor is further configured such that identifying areas in the non-ghost areas of the high-dynamic range image that have details includes identifying areas in the non-ghost areas of the high-dynamic range image that have edges.

14. The apparatus of claim 11, wherein the at least one processor is further configured such that identifying areas in the non-ghost areas of the high-dynamic range image that have details is accomplished at least in part by identifying the non-ghost areas of the high-dynamic range image in which the difference in average luma values between close groups of pixels exceeds a pre-determined threshold.

15. The apparatus of claim 14, wherein the at least one processor is further configured such that the size of each of the groups of pixels is pre-determined.

16. A non-transitory computer readable storage medium having stored thereon instructions that, when executed, enables actions comprising:
receiving an original image that includes lines and at least two fields, each field of the at least two fields including a subset of the lines in the original image such that the lines of each of the at least two fields are interlaced with each other, each of the at least two fields captured at a different exposure than each other such that there is at least a partial overlap in capture time for each of the at least two fields;
normalizing the original image to bring values of at least one of the at least two fields down to values of a different field;
separating each of the at least two fields from each other to provide separate images;
upscaling each of the separate images;
blending the upscaled separate images to generate a high-dynamic range image;
performing ghost identification on the high-dynamic range image; and
performing detail identification on the high-dynamic range image, including identifying areas in the non-ghost areas of the high-dynamic range image that have details, and modifying the high-dynamic image by replacing each of the areas identified to have details with the corresponding area from the original image, the size of the identified areas being based at least in part on the resolution of the original image;
wherein identifying the areas in the non-ghost areas comprising identifying at least one location in the high-dynamic range image where a difference between luma values of two different close areas exceed a threshold.

17. The non-transitory computer readable storage medium of claim 16, wherein identifying areas in the non-ghost areas of the high-dynamic range image that have details includes identifying areas in the non-ghost areas of the high-dynamic range image that have edges.

18. The non-transitory computer readable storage medium of claim 16, wherein
upscaling each of the separate images includes, for each of a plurality of pixel values to be determined, determining difference in pixel values from a plurality of different directions on each side of the pixels, and for each of the different directions, determining the direction at which the difference between pixels values in that direction is the least from among of the plurality of directions, and employing the average of the pixels in the determined direction for the pixel value to be determined.

19. The non-transitory computer readable storage medium of claim 16, wherein identifying areas in the non-ghost areas of the high-dynamic range image that have details is accomplished at least in part by identifying the non-ghost areas of the high-dynamic range image in which the difference in average luma values between close groups of pixels exceeds a pre-determined threshold.

20. The non-transitory computer readable storage medium of claim 19, wherein the size of each of the groups of pixels is pre-determined.

* * * * *